US011311018B2

(12) United States Patent
Baechtle et al.

(10) Patent No.: US 11,311,018 B2
(45) Date of Patent: Apr. 26, 2022

(54) SAUSAGE CASING STORAGE WITH FILLING LEVEL MONITORING

(71) Applicant: ALBERT HANDTMANN MASCHINENFABRIK GMBH & CO. KG, Biberach (DE)

(72) Inventors: Manfred Baechtle, Schemmerhofen (DE); Kurt Strohm, Attenweiler (DE); Jochen Merk, Ochsenhausen (DE); Klaus Schmid, Riedlingen (DE); Andreas Betz, Baustetten (DE); Gerhard Schliesser, Wain (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 3 days.

(21) Appl. No.: 16/938,714

(22) Filed: Jul. 24, 2020

(65) Prior Publication Data

US 2021/0022353 A1 Jan. 28, 2021

(30) Foreign Application Priority Data

Jul. 26, 2019 (EP) .................................... 19188647

(51) Int. Cl.
*A22C 11/00* (2006.01)
*A22C 11/02* (2006.01)
(Continued)

(52) U.S. Cl.
CPC .......... *A22C 11/0236* (2013.01); *A22C 13/02* (2013.01); *A22C 18/00* (2013.01)

(58) Field of Classification Search
CPC . A22C 11/00; A22C 11/0236; A22C 11/0272; A22C 13/02; A22C 18/00;
(Continued)

(56) References Cited

U.S. PATENT DOCUMENTS 3,672,001 A * 6/1972 Greider .............. A22C 11/0236 452/31
4,830,171 A 5/1989 Kupper
(Continued)

FOREIGN PATENT DOCUMENTS

DE 4223128 A1 * 1/1993 ......... A22C 11/0236
DE 4223128 A1 1/1993
(Continued)

OTHER PUBLICATIONS

Japanese Patent Office, Office Action Issued in Application No. 2020-118430, dated Jul. 27, 2021, 7 pages.

*Primary Examiner* — Richard T Price, Jr.
(74) *Attorney, Agent, or Firm* — McCoy Russell LLP

(57) ABSTRACT

A method and a device for separating shirred casing sticks, where a row $R_1$ with a first number of consecutively disposed shined casing sticks in a shined casing stick storage is pushed in a first stroke cycle by a pusher along a sloped plane in the direction of a separation edge and one after the other over the separation edge and, once the last shined casing stick of the row has been pushed over the separation edge, the pusher moves back along the sloped plane and takes a row $R_2$ with a second number of consecutively disposed shined casing sticks and pushes them in a further stroke cycle in the direction towards the separation edge, characterized in that a control device determines the filling level of shined casing sticks in the shined casing stick storage from the number of shined casing sticks pushed over the separation edge.

15 Claims, 4 Drawing Sheets

(51) Int. Cl.
*A22C 13/02* (2006.01)
*A22C 18/00* (2006.01)

(58) Field of Classification Search
CPC .... B65G 2203/0241; B65G 2201/0202; B65G 43/08; B65G 47/1471
USPC .............................................................. 452/21
See application file for complete search history.

(56) References Cited

U.S. PATENT DOCUMENTS

| | | | | |
|---|---|---|---|---|
| 5,297,986 | A * | 3/1994 | Ristvedt | G07D 3/128<br>453/32 |
| 2021/0022353 | A1 * | 1/2021 | Baechtle | A22C 11/0236 |

FOREIGN PATENT DOCUMENTS

| | | | |
|---|---|---|---|
| EP | 2495191 | A1 | 9/2012 |
| EP | 3127840 | A1 | 2/2017 |
| JP | H05192068 | A2 | 8/1993 |
| JP | 2012184074 | A2 | 9/2012 |

* cited by examiner

SAUSAGE CASING STORAGE WITH FILLING LEVEL MONITORING

CROSS-REFERENCE TO RELATED APPLICATION

The present application claims priority to European Patent Application No. 19 188 647.2 filed on Jul. 26, 2019. The entire contents of the above-listed application is hereby incorporated by reference for all purposes.

TECHNICAL FIELD

The present disclosure relates to a method and a device for determining the filling level of shirred casing sticks in a shirred casing stick storage in sausage production.

A method and a device for determining the filling level of shirred casing sticks in a shirred casing stick storage in sausage production are already known, for example, from the DE4223128.

BACKGROUND AND SUMMARY

In the automated production of sausages with linking lines, the shirred sausage casings, i.e. the shirred casing sticks provided for the stuffing process, are stored in a shined casing stick storage or sausage casing storage, respectively. In order to move them individually into the mounting device, they are separated with the aid of a light barrier and a pusher that moves along a sloped plane. In each separation process, only one shined casing stick is moved over a separation edge into a mounting device. Depending on the filling level of the shined casing stick storage, the pusher can simultaneously move several shined casing sticks in a row consecutively upwards in the direction towards the separation edge. If the pusher is driven to an upper end position without the light barrier detecting a shined casing stick, then there is no more shined casing stick disposed on the pusher. With a complete return stroke under the feed slope, further shined casing sticks can again roll in front of the pusher. Depending on the filling level of the shined casing stick storage or depending on the caliber size, i.e. the diameter of the shined casing sticks, one or more shined casing sticks can be disposed in front of the pusher. At a low filling level of the shined casing stick storage, only one shined casing stick rolls in front of the pusher during the downwardly motion.

The problem arises there that the operator has to constantly observe the filling level in the shined casing stick storage and has to refill shined casing sticks early, so that the production process does not come to a standstill due to a lack of shined casing sticks.

Proceeding from there, the present disclosure is based on the object of monitoring the filling level in a simple and inexpensive manner without the need for additional sensors.

According to the present disclosure, this object is satisfied with the features of described herein.

In the method according to the present disclosure, shined casing sticks are stored in a shined casing stick storage. These shined casing sticks are pushed by way of a pusher in a row $R_1$ with a first number of consecutively disposed shined casing sticks during a first stroke cycle along a sloped plane in the direction of a separation edge. The shined casing sticks are then pushed one after the other over the separation edge and can be transferred to a centering device. After the last shined casing stick of row $R_1$ has been pushed over the separation edge, the pusher moves back along the sloped plane and a further row $R_2$ with a second number of consecutively disposed shined casing sticks can be taken by the pusher and pushed in a further stroke cycle in the direction towards the separation edge. This means that the number of shined casing sticks in the shined casing stick storage decreases while the stroke cycles are repeated one after the other. According to the present disclosure, the filling level of shined casing sticks in the shined casing stick storage can now be determined from the number of shined casing sticks pushed over the separation edge. This means that the filling level can be determined by the control device without the need for additional sensors such as a filling level gauge etc. It can thus be reliably assessed when the shined casing stick storage needs to be refilled and it is ensured that the production process does not come to a standstill due to a lack of shined casing sticks.

It is particularly advantageous to have the filling level of shined casing sticks in the shined casing stick storage be determined in dependence of the number of shined casing sticks of a row which are pushed over the separation edge in a stroke cycle before the pusher is again moved back, in particular moved completely back to a region below the sloped plane. With decreasing filling level, fewer and fewer shined casing sticks roll onto the pusher, which means that the row of consecutively disposed shined casing sticks then has a smaller number of shined casing sticks than at a high filling level. The control device can thus assign a certain filling level to the number determined, i.e. the number of shined casing sticks determined in a row (for the corresponding caliber or diameter that is entered into the control device). For example, it can be concluded that there is only a certain number of shirred casing sticks present in the storage at a given time. The advantage of this approach is that the filling level can be determined even it is not known how many shined casing sticks were originally introduced into the shined casing stick storage. This means, for example, if a new pack of shined casing sticks is introduced into the shined casing stick storage and a certain number of shined casing sticks have been removed in advance, because the shined casing sticks are defective or unusable, a reliable and accurate statement about the filling level can nevertheless be made. Even if a system is put into operation and the shined casing stick storage is only partially filled without there being knowledge about how many shined casing sticks are actually in the shined casing stick storage, the procedure for determining the filling level can be started immediately.

According to at least one example embodiment, the control device then generates, for example, a signal, i.e. a warning signal for a display, if the number of shined casing sticks of a row is only 1. This warning signal prompts the operator visually and/or acoustically to refill shined casing sticks. If the pusher, after being completely moved back, then pushes only one shined casing stick over the separation edge during a subsequent stroke cycle, it is determined that the number in the row is “1”. For example, it may be determined that there is one shined casing stick in the row. Depending on the caliber size known to the control device, it can then again be concluded, as described above, that only a certain number of shined casing sticks (empirically determined for each casing caliber) are disposed in the storage at this point in time. A corresponding signal generated by the control device then represents a minimum level. However, a corresponding warning signal can also be output where the number of shined casing sticks is greater than 1, meaning that an early warning is given, for example, for a number of 3 shined casing sticks or more in a row.

According to the present disclosure, a sensor is provided in the region of the separation edge, in particular a light barrier, which detects whether a shined casing stick has passed this region. In the region of the separation edge means in the upper region of the sloped plane or on the upper rolling plane, respectively, behind the separation edge (where the distance of the sensor from the edge is in a range of 5-30 mm. If the pusher is moved to an uppermost position and the sensor no longer outputs a signal, it can be assumed that there is no longer any shined casing stick in front of the pusher and the pusher can be moved back.

The control device can determine the filling level with the aid of the already existing sensor and, in particular, additionally by way of the shirred casing stick diameter stored and/or the position of the pusher.

Depending on the filling level determined (which for a certain caliber corresponds to the number of shirred casing sticks in a row for one stroke cycle), a signal can then be generated and, for example, be displayed visually and/or acoustically. The signal may change in dependence of the filling level determined. This allows the operator to monitor the filling level and be warned early.

It is also possible that, if a minimum level is undercut, a warning signal indicating to the operator that refilling is necessary is output and displayed visually and/or acoustically.

For example, escalation steps can also be provided, from flashing slowly, increasingly faster to a continuous light on the control panel or on a separate signal lamp. An intermittent acoustic signal can respectively sound faster and/or louder.

It is possible that the number of shirred casing sticks pushed over the separation edge in a row during a stroke cycle are counted by way of the sensor signal. For this purpose, a counter can count or add up the sensor signals. Alternatively or in addition, it is possible that the number is determined on the basis of the position of the pusher that it assumes when the sensor detects an uppermost shirred casing stick of a row in the region of the separation edge and based on the diameter of the shirred casing sticks. The number of shirred casing sticks in front of the pusher can be determined from the arising pusher/sensor distance and the known diameter.

These solutions are easy to implement with the existing components and therefore particularly inexpensive.

If the number of shirred casing sticks introduced in the shined casing stick storage is known, it is also alternatively possible to simply count the number of shined casing sticks that are pushed over the separation edge, for example, by way of a counter in the control device, which counts or adds up the signals of the sensor From a certain number of shined casing sticks pushed over the separation edge, a corresponding signal can then be output for optical and/or acoustic display.

It is also possible that a signal is generated in dependence of the filling level determined which causes that shined casing sticks to be fed in an automated manner by a feed device, i.e., when a certain filling level is undercut. In addition or alternatively, it is also possible to reduce the production speed to ensure continuous production.

A device for performing the method comprises a pusher which can push a row with a first number of consecutively disposed shined casing sticks along a sloped plane over the separation edge in a first stroke cycle and which can move back after the last shined casing stick of the row has been pushed over the separation edge and can then take a row with a second number of consecutively disposed shined casing sticks and in a further stroke cycle push them in the direction of and over the separation edge. According to the present disclosure, a control device is provided which is formed such that the filling level of shined casing sticks in the shined casing stick storage can determine [sic] the number of shined casing sticks which are pushed over the separation edge.

BRIEF DESCRIPTION OF THE DRAWINGS

The present disclosure shall be explained below in more detail with reference to the following figures.

DETAILED DESCRIPTION

Figure 1:
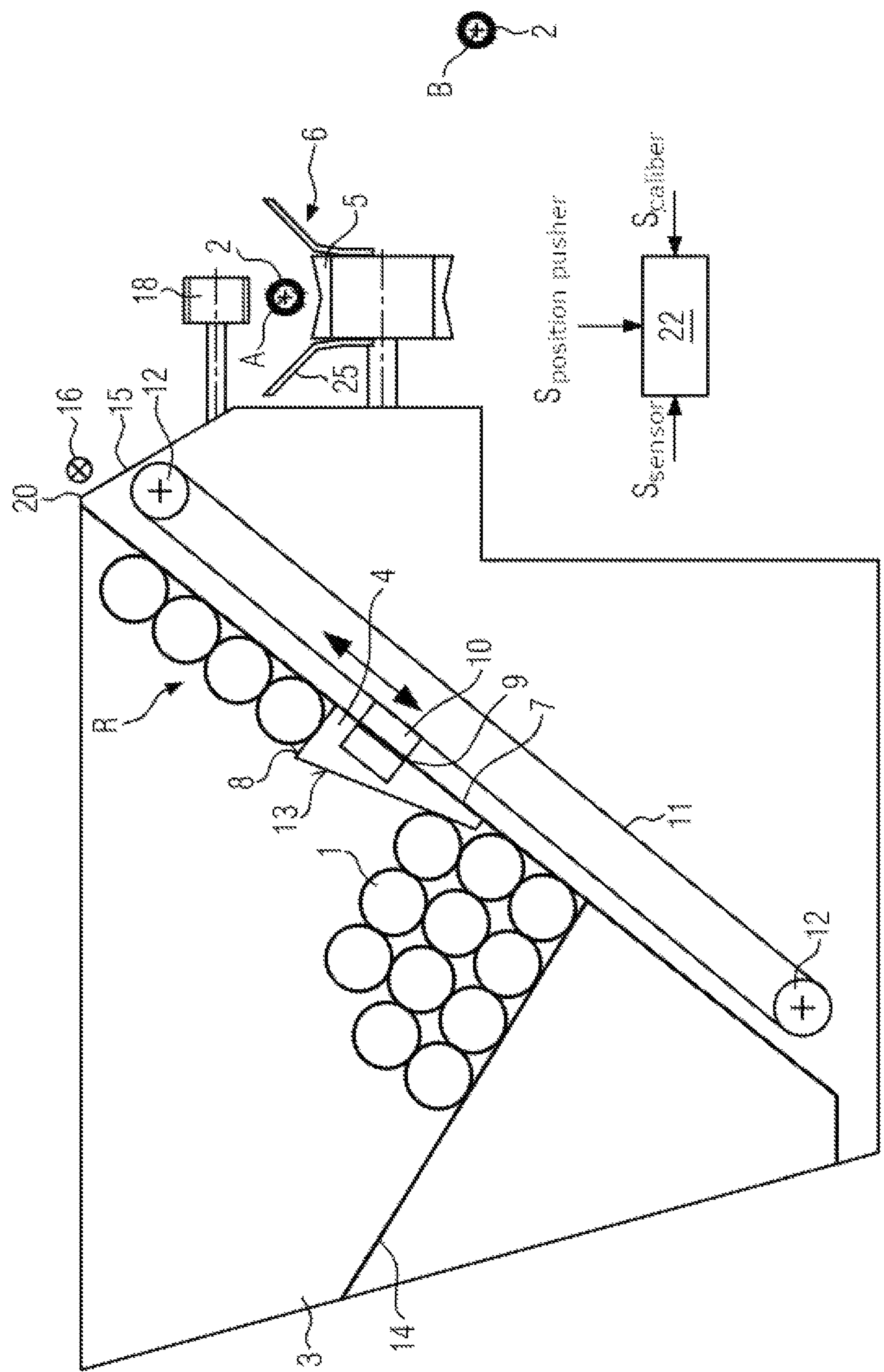
FIG. 1 shows schematically a device according to the present disclosure in cross-section.

FIG. 1 shows an embodiment of a device according to the present disclosure for the separation of shined casing sticks, according to which a correspondingly separated shined casing stick 1 can be drawn onto a stuffing tube 2.

Shined casing sticks 1 are disposed in shined casing stick storage 3. The shined casing sticks are taken in a row R with a pusher 4 and pushed in the direction of a separation edge 20. Then they can be fed, for example, in a known manner to a guide surface 5 of a centering device 6 in order to be drawn onto a stuffing tube 2. Shined casing stick storage 3 has a base wall 7 in the form of a sloped plane which is inclined relative to the horizontal. Pusher 4 moves along this sloped plane. It comprises a pushing surface 8, the dimension of which is matched to the diameter of the shirred casing sticks, for example, from caliber 13 to 130 mm. Only one row R of shined casing sticks 1 disposed one above the other is transported by pusher 4 in the direction of separation edge 20. Pusher 4 is guided there, for example, by way of two magnetic couplings 9 along base wall 7 of storage container 3. For example, guide magnet 10 for magnetic coupling 9 is attached to an endless conveyor belt 11 which is directed over two conveyor rollers 12. The pusher can therefore be moved in as well as against the direction of conveying. The drive can there be effected by a servo motor that has not been shown. Arranged at the respective upper and lower end of base wall 7 of shined casing stick storage 3 can be an end switch which is triggered by pusher 4 and can reverse the direction of motion of pusher 4. However, it is also possible that the pusher reverses when no more shined casing sticks are detected by a sensor 16, for example, a light barrier, in the region of separation edge 20 or if an end position is determined by the control device of the servo motor.

Side 13 of pusher 4, which is arranged against the direction of conveying, is formed as a sloped surface so that shined casing sticks 1 are not damaged when pusher 4 returns to the lower end of base wall 7. Shined casing stick storage 3 also has a base surface 14 which is sloped in the direction towards base wall 7 and also relative to the horizontal. Shined casing sticks 1 present in shined casing stick storage 3 then roll in the direction of pusher 4 due their own weight, so that they are conveyed by the latter to the upper end of base wall 7. Formed in base surface 14 is a recess which accommodates pusher 4 when the latter is moved against the direction of conveying to such a degree that pusher surface 8 of pusher 4 can be returned to behind base surface 14, so that all shined casing sticks 1 can be conveyed out of shined casing stick storage 3.

Adjoining separation edge 20 is rolling surface 15 via which the shined casing sticks reach guide surface 5 of centering device 6.

The device further comprises a control device 22 which is formed such that the filling level of shined casing sticks in shined casing stick storage 3 can be determined from the number of shined casing sticks that are pushed over separation edge 20, as explained in more detail below. For this purpose, control device 22 may comprise instructions stored in non-transitory memory for receiving and evaluating several signals. For example, a signal $S_{caliber}$ can be entered into control device 22 and indicates the diameter d of the shined casing sticks. In at least one example, the signal $S_{caliber}$ may be received via an operator input to the control device 22 to enter the caliber information. Furthermore, a signal $S_{position\ pusher}$ can be routed into control device 22, for example, by a control device of a servo drive, and indicates the position of the pusher. Furthermore, a sensor signal $S_{sensor}$ (e.g., from sensor 16) can also be routed to control device 22 and indicates whether a shirred casing stick has passed the region of sensor 16 or not. The control device 22 may further include instructions stored in non-transitory memory for actuating one or more actuators responsive to the signals that are received and evaluated.

The method of the present disclosure shall be explained in more detail below. In at least one example, the methods described herein may be executed by controller 22 based on instructions stored in non-transitory memory of the controller and in conjunction with signals received from components of the device, such as the $S_{caliber}$, $S_{position\ pusher}$, $S_{sensor}$, and end switch signals described herein. Controller 22 may employ actuators of the device (e.g., servo drive that actuates pusher 4) to adjust operation according to the methods described below.

For example, shined casing sticks 1 from a cardboard box are filled by an operator into shined casing stick storage 3. Alternatively, it is also possible that the shined casing sticks are fed by an automated feed device (not shown). Due to the sloped base surface 14, shined casing sticks 1 roll in the direction towards the lower end of sloped base wall 7.

Figure 2A:
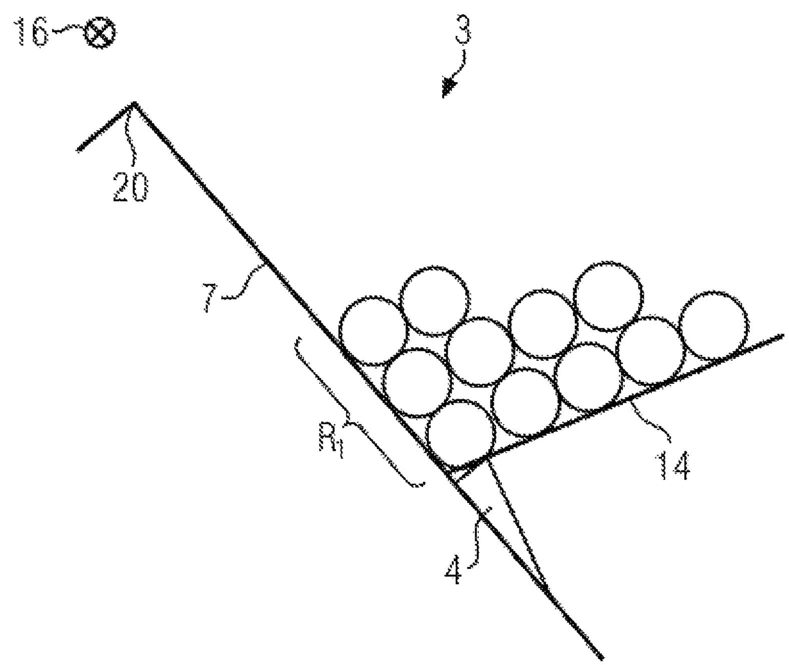
FIG. 2*a*, FIG. 2*b*, FIG. 2*c*, and FIG. 2*d* show simplified partial sectional views of the device shown in FIG. 1 with changed filling levels.
Figure 2B:
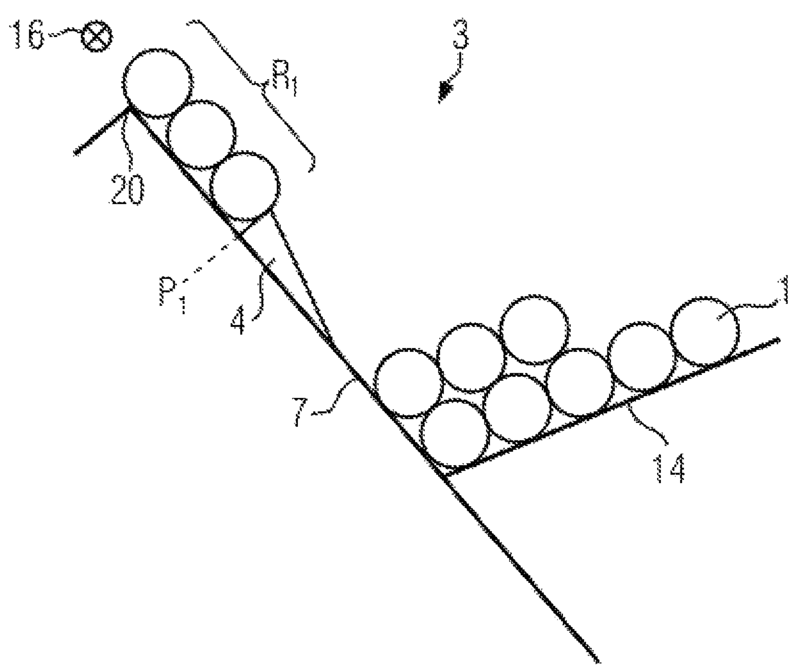
Figure 2C:
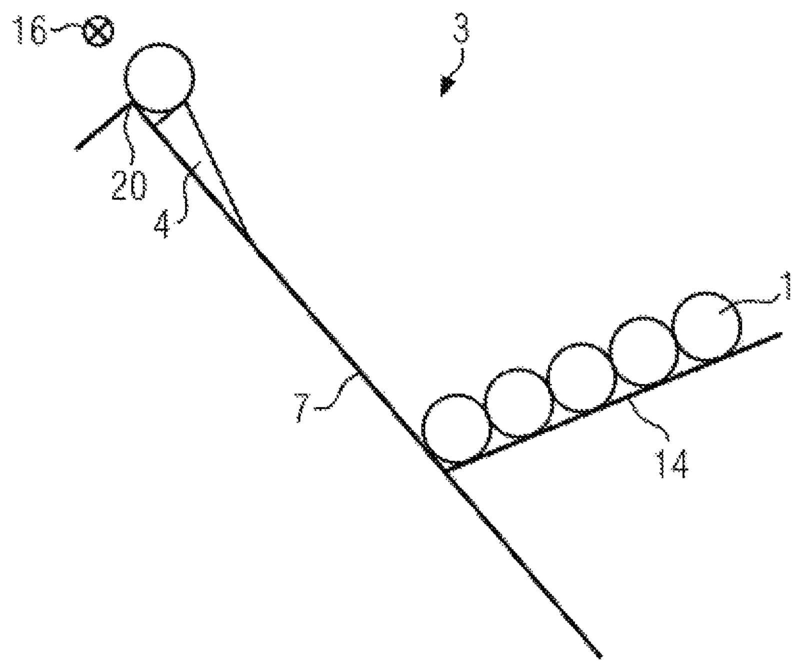

As can be seen from FIG. 2*a*, pusher 4 is initially located below base surface 14 of the shined casing stick storage. Pusher 14 is then moved upwardly by the servo drive in the direction towards separation edge 20 and takes a row $R_1$ of shined casing sticks 1. The number of shined casing sticks of the row $R_1$ is "3". For example, it may be that there are three shined casing sticks in the row $R_1$. Pusher 4 then moves row $R_1$ towards edge 20 until the uppermost shined casing stick rolls over separation edge 20, as shown in FIG. 2*b*. Sensor 16, i.e. presently a light barrier, can there detect the brief presence of shined casing stick 1. The shined casing stick can then roll over rolling surface 15 and feed bridge 25 onto guide surface 5. The conveying motion of pusher 4 is stopped by control device 22 so that only one shined casing stick is separated at a time. If a new shined casing stick is to be centered, pusher 4 again moves upwardly until shined casing stick 1 is detected and can roll off. Once all shined casing sticks of a row R have been pushed over separation edge 20, this is recognized by control device 22 in that, for example, the number of shined casing sticks is determined as described below—in particular from the comparison of the values of the caliber size and the pusher position. Pusher 4 then again moves downwardly in the opposite direction. The reverse motion can also be triggered by an end switch which is actuated in the uppermost position of the pusher or by the servo drive control device. The pusher can then reach the lower end of base wall 7 where it triggers e.g. a lower end switch, whereby the motion of pusher 4 is stopped and the direction of motion of pusher 4 is reversed again. However, it is also possible that the control device of the servo drive reverses the direction. As can be seen from FIG. 2*b*, the pusher would then accommodate a further row $R_2$ (not shown) which has a number of two shirred casing sticks. In this subsequent stroke cycle, two shined casing sticks would then be pushed in the direction towards separation edge 20 and, when both shined casing sticks had been pushed one after the other over edge 20, pusher 4 would move back, where then, for example, only one shined casing stick would lie on the pusher in a new stroke cycle, as shown in FIG. 2*c*. In FIG. 2*c*, a shined casing stick is pushed over separation edge 20. In this embodiment, the filling level of shined casing sticks in the shined casing stick storage can be determined in dependence of the number of shined casing sticks 1 of a row R which are pushed over the separation edge in a stroke cycle. The number of shined casing sticks in a row is substantially proportional to the filling level for a particular shined casing stick diameter.

For example, the number of shined casing sticks in a row can be determined as follows. The number of shined casing sticks in a row pushed over separation edge 20 during a stroke cycle can be counted by way of the sensor signal of sensor 16, for example, in that control device 22 comprises a counter that adds up the sensor signals in a stroke cycle. This means, for example, that a certain number of shined casing sticks, in FIG. 2*b* three, are pushed over edge 20 and then no further shined casing stick is detected by way of sensor 16, although, for example, pusher 4 is moved to its upper end position. The number determined, or the value proportional thereto, then corresponds to a certain filling level which was determined empirically for each casing caliber.

Alternatively, the number can also be determined on the basis of the position of pusher 4, where control device 22 receives a corresponding signal $S_{position\ pusher}$ from the control device of the servo drive. This means that position Pi of the pusher (see FIG. 2*b*) can be detected or is known, respectively. The position is the position that the pusher has assumed when sensor 16 detects an uppermost shined casing stick of a row in the region of separation edge 20. Due to this position and the signal $S_{caliber}$ entered, which corresponds to the diameter d of a shined casing stick, the number of shined casing sticks disposed in a region between pusher 4 and sensor 16 or the separation edge can be determined.

A corresponding signal, for example, for an optical and/or acoustic display, can then be output in dependence of the shined casing sticks determined in a row which is pushed over separation edge 20 during a stroke cycle. The signal can be displayed, for example, optically as a filling level indication on the display or the control panel of the filling machine or a separate display/signal lamp. Depending on the number of shined casing sticks still present in the shined casing stick storage, the signal to the operator can also be changed, for example, in escalation steps from flashing slowly, increasingly faster to a continuous light on the control panel or at a separate signal lamp.

An intermittent acoustic signal can similarly sound faster and/or louder. The operator can thus monitor the filling level in a simple manner and respond accordingly and fill in new shined casing sticks.

It is also possible that control device 22 generates a signal in dependence of the specific filling level that causes shined casing sticks 1 to be supplied in an automated manner by a feed device (not shown) and/or the production speed to be reduced to ensure a continuous process.

Figure 2D:
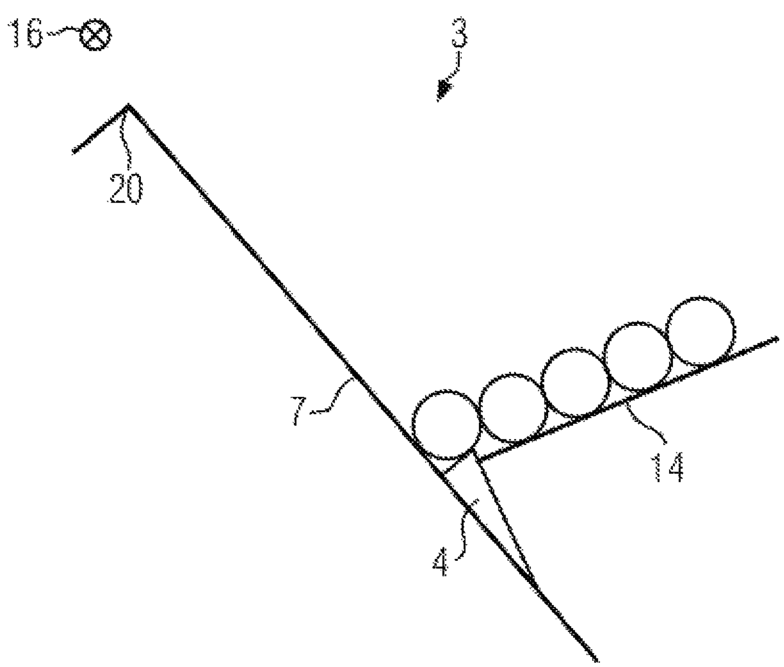

A warning signal that is displayed optically and/or acoustically is output at the latest when the number of shined casing sticks in a row is "1", as shown in FIGS. 2*c* and 2*d*. For example, a lowest number of shined casing sticks in a row that triggers the warning signal to be displayed optically and/or acoustically is one.

As an alternative to the previously shown method, it is also possible that shined casing sticks pushed over separation edge 20 are counted with the light barrier and a signal is generated which is visually and/or acoustically indicated, where, a warning signal is output, in particular from a certain number, as described above, and visually or acoustically indicates that shined casing sticks must be refilled. For example, if the operator fills a carton containing a known number of shined casing sticks into the shined casing stick storage, the counter can be reset and a new count can begin.

Regardless of the embodiment, the display can be effected in the control panel of the filling machine or at another signal device. Lighting in the base region of the shined casing stick storage is also conceivable. The filling level can be displayed continuously so that the operator can see how many shined casing sticks are still in storage 3. In addition or alternatively, a warning signal that prompts for refilling can be output at a minimum filling level. There is also the possibility that the operator himself can set the point in time of the warning signal by entering a minimum degree of the filling level. Depending on the production performance, there is then enough time to refill the storage. The "low level" signal can also be processed electrically or in terms of data technology.

Figure 3:
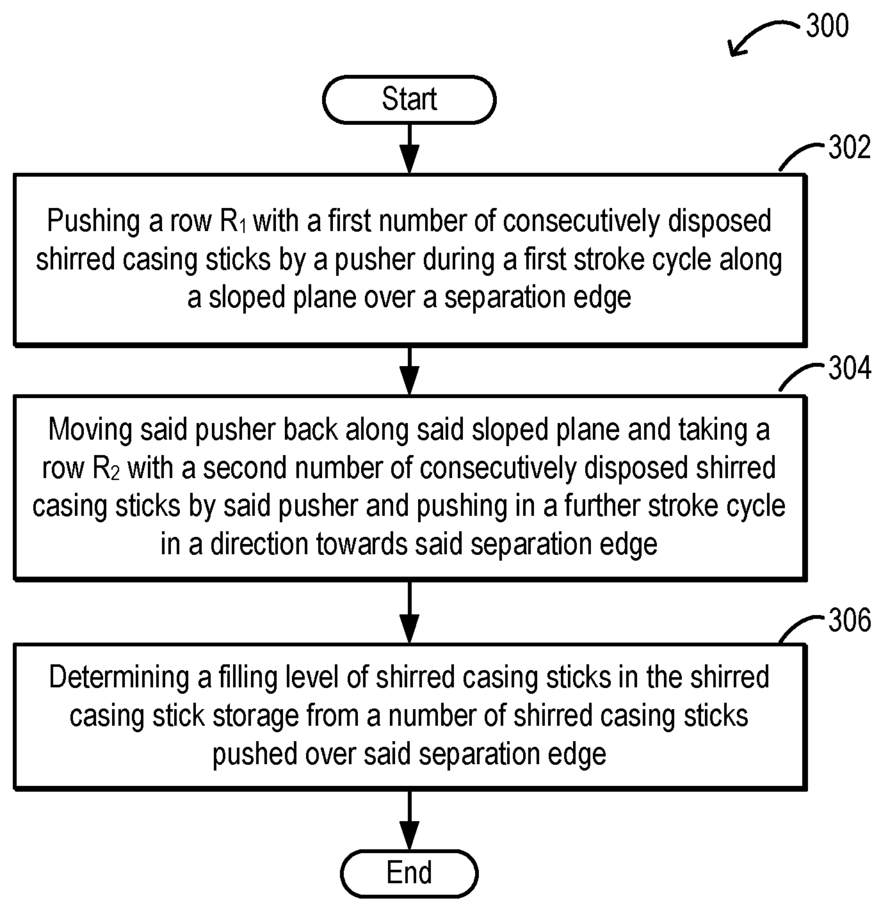
FIG. 3 shows a flow chart of an example method according to one or more embodiments of the present disclosure.

Turning now to FIG. 3, FIG. 3 shows a flow chart of an example method 300 according to one or more embodiments of the present disclosure.

Method 300 is a method for determining a filling level of shirred casing sticks in a shirred casing stick storage in sausage production. For separating said shined casing sticks, method 300 includes, in said shined casing sticks storage, pushing a row $R_1$ with a first number of consecutively disposed shined casing sticks by a pusher during a first stroke cycle along a sloped plane over a separation edge at step 302.

Once the last shined casing stick of said row $R_1$ has been pushed over said separation edge at step 302 (for example, after all of the casing sticks of said row $R_1$ have been pushed over said separation edge) method 300 includes moving said pusher back along said sloped plane and taking a row $R_2$ with a second number of consecutively disposed shined casing sticks by said pusher and pushing in a further stroke cycle in a direction towards said separation edge.

A control device further determines a filling level of shined casing sticks in said shined casing stick storage from a number of shined casing sticks pushed over said separation edge at step 306 of method 300.

The invention claimed is:

1. Method for determining a filling level of shined casing sticks in a shined casing stick storage in sausage production, where, for separating said shined casing sticks, in said shined casing sticks storage, pushing a row $R_1$ with a first number of consecutively disposed shined casing sticks by a pusher during a first stroke cycle along a sloped plane over a separation edge; and once the last shined casing stick of said row $R_1$ has been pushed over said separation edge, moving said pusher back along said sloped plane and taking a row $R_2$ with a second number of consecutively disposed shined casing sticks by said pusher and pushing in a further stroke cycle in a direction towards said separation edge, wherein a control device determines a filling level of shined casing sticks in said shined casing stick storage from a number of shined casing sticks pushed over said separation edge, wherein the filling level of shirred casing sticks in said shirred casing stick storage is determined in dependence of the number of shirred casing sticks of a row $R_1$ which are pushed over said separation edge in a stroke cycle before said pusher again moves back.

2. The method according to claim 1, wherein said pusher moves completely back to a region below said sloped plane before said pusher again moves back.

3. The method according to claim 1, wherein said control device outputs a warning signal at latest when the number of shined casing sticks of a row is one.

4. The method according to claim 1, wherein a sensor is provided in a region of said separation edge and detects whether a shined casing stick has passed said separation edge.

5. The method according to claim 4, wherein the sensor is a light barrier.

6. The method according to claim 4, wherein said control device determines the filling level with aid of said sensor.

7. The method according to claim 6, wherein said control device additionally determines the filling level by way of a shined casing stick diameter stored and/or a position of said pusher.

8. The method according to claim 1, wherein a signal for an optical and/or acoustic display of the filling level is output in dependence of the filling level determined and a signal.

9. The method according to claim 8, wherein a display is changed in dependence of the filling level.

10. The method according to claim 1, wherein a warning signal is output, and wherein the warning signal is visually and/or acoustically indicated.

11. The method according to claim 10, wherein the warning signal is output when a minimum filling level is undercut.

12. The method according to claim 1, wherein the number of shirred casing sticks in a row pushed over said separation edge during a stroke cycle is counted by way of a sensor signal, and/or wherein the number of shined sticks in the row pushed over said separation edge during the stroke cycle is determined based on a position of said pusher that said pusher assumes when a sensor detects an uppermost shined casing stick of a row in a region of said separation edge and based on a diameter of said shined casing sticks.

13. The method according to claim 1, wherein the number of shined casing sticks pushed over said separation edge after filling shined casing sticks into said shined casing stick storage is counted.

14. The method according to claim 1, wherein a signal is generated in dependence of the filling level determined and causes shined casing sticks to be fed to said shined casing stick storage in an automated manner by a feed device and/or causes a production speed to be reduced.

15. A device for performing the method according to claim 1 with:

said shined casing stick storage for the accommodating of shined casing sticks;

a pusher, wherein the pusher is configured to push said row $R_1$ with said first number of consecutively disposed shined casing sticks in said first stroke cycle along said sloped plane one after the other over said separation edge, and wherein the pusher is configured to move back along said sloped plane after the last shined casing stick of said row $R_1$ has been pushed over said separation edge and then take said row $R_2$, wherein said row $R_2$ is a subsequent row with said second number of consecutively disposed shined casing sticks and push them in said further stroke cycle in said direction of said separation edge; and said control device, wherein said control device is configured to determine said filling level of shined casing sticks in said shined casing stick storage from said number of shined casing sticks pushed over said separation edge.

* * * * *